July 24, 1956     S. S. JACOBS ET AL     2,755,980
MACHINE FOR FILLING LIQUIDS INTO CONTAINERS
Filed Dec. 30, 1953     2 Sheets-Sheet 2
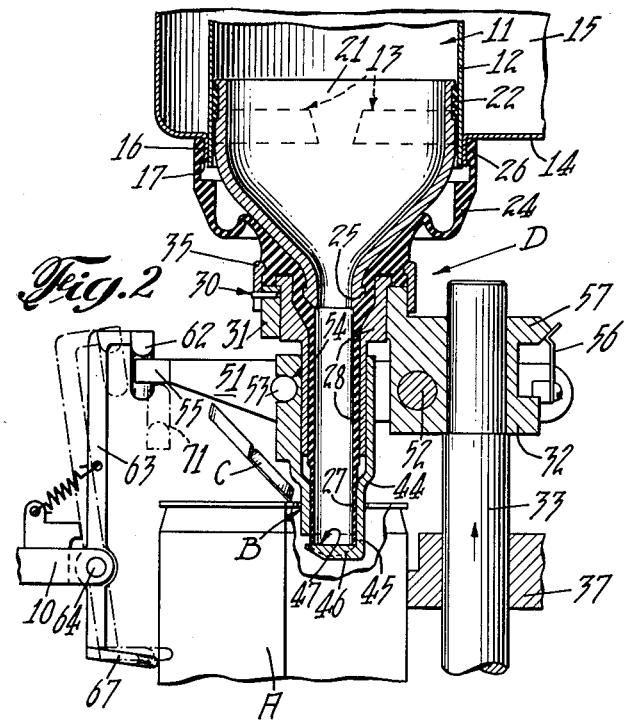
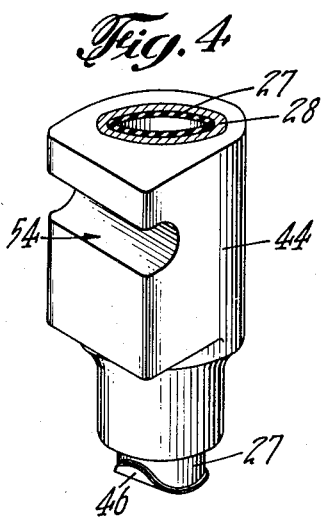
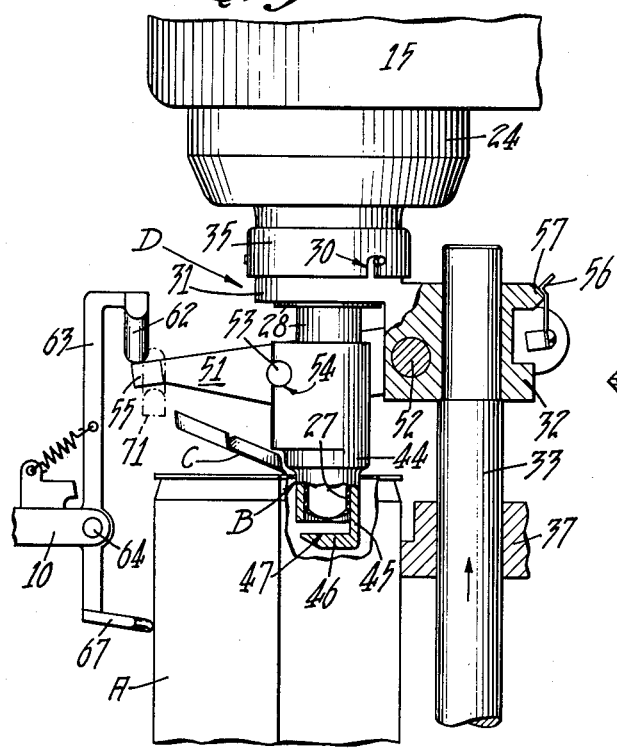
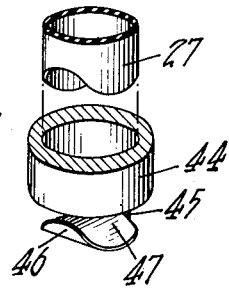
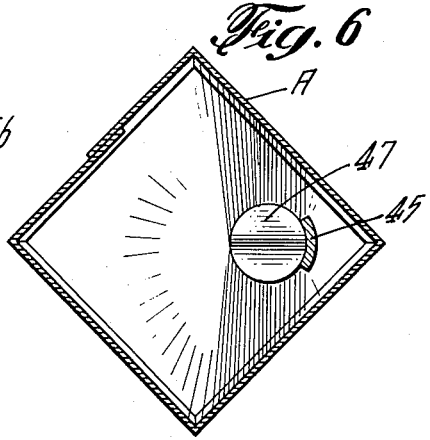
INVENTORS
SAMUEL S. JACOBS
WILLIAM PECHY
ATTORNEYS United States Patent Office 2,755,980
Patented July 24, 1956

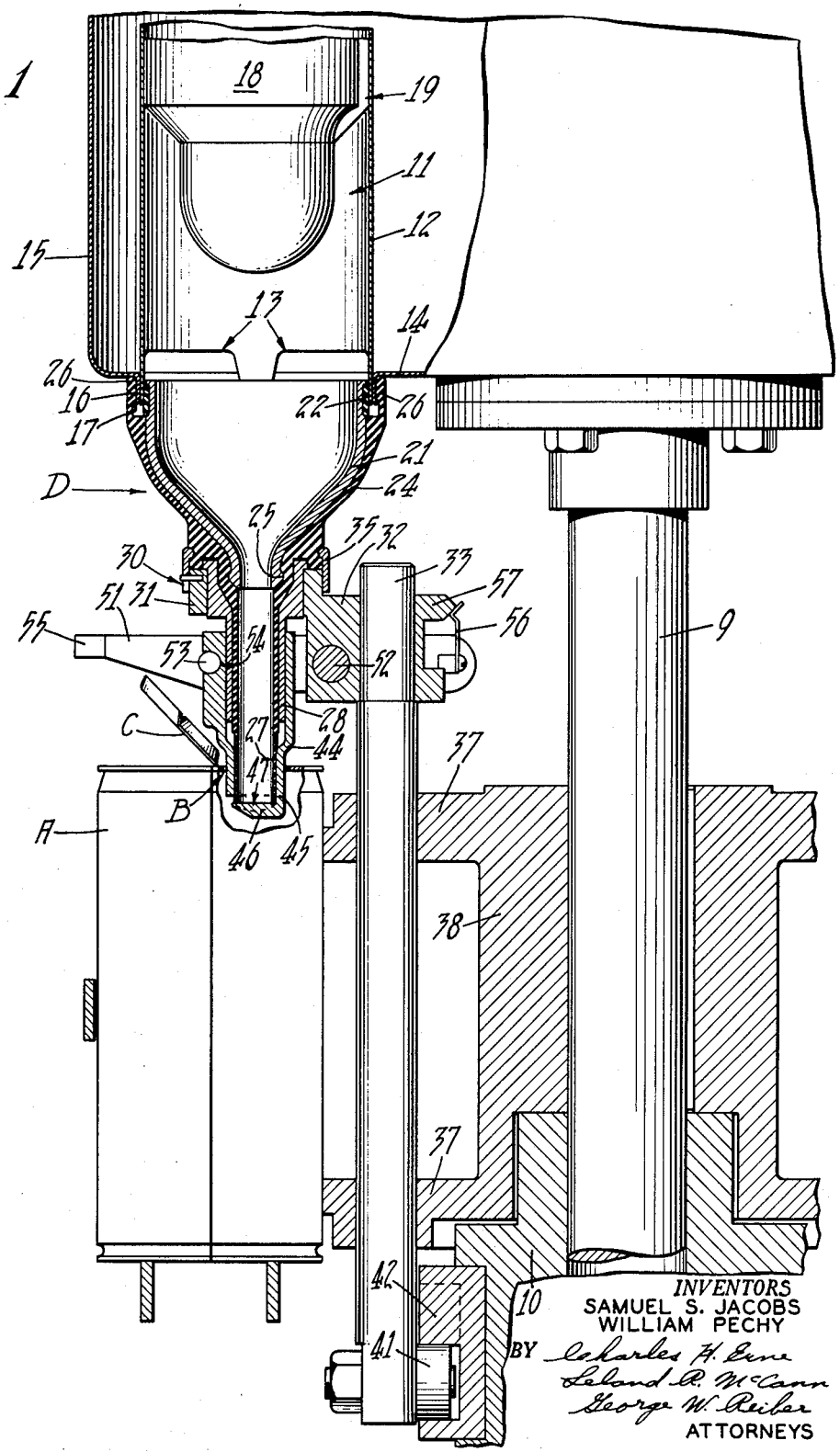

2,755,980

MACHINE FOR FILLING LIQUIDS INTO CONTAINERS

Samuel S. Jacobs, Forest Hills, N. Y., and William Pechy, Belmar, N. J., assignors to American Can Company, New York, N. Y., a corporation of New Jersey Application December 30, 1953, Serial No. 401,257

5 Claims. (Cl. 226—97)

The present invention relates to machines for filling liquids, such as milk and the like, into fibre containers and has particular reference to an improved filling nozzle for such machines.

An object of the invention is the provision of a filling nozzle for a milk filling machine wherein a full unrestricted opening is provided through the nozzle to deliver the milk quickly in large volume and thereby reduce to a minimum the tendency of the milk to foam.

Another object is the provision of such a filling nozzle in which the parts are arranged to reduce the fall and velocity of the milk passing therethrough so as to reduce foaming of the milk to a minimum.

Another object is the provision of such a filling nozzle which is designed to direct the milk during delivery in predetermined directions and concentrated streams so as to provide for natural venting of the air from the containers through spaces defined by the directional flow of the milk.

Another object is the provision of such a filling nozzle wherein the parts are designed to maintain sanitary conditions in the machine and are readily disassembled for cleaning to prevent contamination of the milk handled in the machine.

Numerous other objects and advantages of the invention will be apparent as it is better understood from the following description, which, taken in connection with the accompanying drawings, discloses a preferred embodiment thereof.

Referring to the drawings:

Figure 1 is a sectional view taken through the filling head portion of a filling machine embodying the instant invention, with parts broken away, the view showing a container in place under the head;

Fig. 2 is a fragmentary view similar to Fig. 1, showing parts of the filling head in a different position in readiness to fill a container;

Fig. 3 is a view similar to Fig. 2 showing the filling head parts in position when filling a container;

Fig. 4 is an enlarged perspective view showing details of a filling head valve used in the apparatus, parts being broken away;

Fig. 5 is a fragmentary enlarged perspective view showing the valve parts in exploded relation with parts broken away; and Fig. 6 is a top plan view of the interior of a container being filled with the filling nozzle in place.

As a preferred or exemplary embodiment of the invention the drawings illustrate the filling head portion of a conventional rotary type filling machine having a plurality of heads traveling along a circular path of travel for filling milk products into rectangular fibre containers A (Fig. 1) of the character disclosed in United States Patent 2,085,979, issued July 6, 1937, to John M. Hothersall on Container. Such a container A is formed with a filling and dispensing opening B located in the top of the container and sealed, after the container is filled, by a friction plug C hingedly attached to the top of the container adjacent the opening.

Upon entering the machine the containers A are in an upright position, with their filling openings B uncovered or open and with the closure plugs C standing upright adjacent the openings. In the machine each container A is positioned under a filling nozzle D and raised slightly to position the nozzle into the opening B of the container for the filling operation.

The filling nozzle D is located at the open bottom end of a vertically disposed measuring chamber 11 (Fig. 1) enclosed by a tubular housing 12 formed with a plurality of inlet ports 13 in the side wall of the housing adjacent its open bottom end. The housing 12 is secured in and extends upwardly from a bottom wall 14 of a rotatable supply tank 15 which carries a supply of the milk to be filled into the containers A in measured quantities or charges. The tank is mounted on the upper end of a vertical rotatable support shaft 9 journaled in bearings in a frame 10. A depending flange 16 having on outwardly projecting terminal bead or flange 17 on the tank bottom holds the housing 12 in place. The ports 13 are normally open and thus admit milk from the tank 15 into the chamber 11. When the chamber is filled a measured charge of milk for one container is segregated from the milk in the tank. An adjustable volume control plunger 18 having a vent channel 19 is provided in the chamber 11 to define the capacity of the measuring chamber.

The filling nozzle D which is located at the bottom of the measuring chamber 11 to dispense or deliver the measured charge of milk in the chamber, includes an inverted conical shaped hollow annular cutoff member 21 having its upper wide end slideably disposed in the lower end of the measuring housing 12, immediately below the inlet ports 13. A resilient gasket 22, preferably made of rubber or other suitable gasket material surrounds the outer face of the wide end of the conical member 21 travels with it and presses against the inner face of the housing 12 to prevent leakage of milk from the measuring chamber 11.

The conical cutoff member 21 is surrounded by a close fitting resilient nozzle 24, preferably made of rubber or the like material, and frictionally secured to the conical member by an outwardly projecting annular snap-over bead 25 on the lower or narrow end of the member. The nozzle 24 is substantially the same shape as the conical member 21 and at its upper large end is formed with an internal annular bead 26 which surrounds the depending flange 16 on the tank bottom 14 and fits over the flange terminal bead 17 to hold the nozzle securely in place in a leakproof joint. At the small end of the conical member 21 the nozzle 24 is provided with a relatively long depending tubular discharge sleeve section 27.

A major portion of the length of the sleeve section 27 of the nozzle 24 is encased in a surrounding bearing sleeve 28. The upper end of the bearing sleeve 28 is located adjacent the small end of the conical member 21 and is carried in a surrounding collar 31 of a lifter block 32 mounted on the upper end of a vertically disposed lifting rod 33 located adjacent the nozzle. The sleeve 28 extends above the collar 31 and is embedded into the resilient nozzle 24 by a clamp band 35 which surrounds the collar and thereby securely connects the resilient nozzle 24 to the bearing sleeve. The clamp band 35 is locked in place on the collar by a bayonet joint 36 which permits of easy removal of the band to quickly disassemble the head for cleaning.

The lift rod 33 is slidably carried in a pair of vertically spaced bearings 37 formed in a double, upper and lower level, pocketed turret 38 carried on and rotating with the tank support shaft 9 to advance the containers through the machine. The rod 33 is raised and lowered as will be more fully explained hereinafter by a cam roller 41 carried on the lower end of the rod. The roller traverses a stationary barrel cam 42 secured to the frame 10.

The lower end of the resilient nozzle 24 is provided with a delivery valve. For this purpose the lower end of the discharge sleeve section 27 of the nozzle is surrounded by a valve sleeve 44 which is open at its bottom end. A short bridge portion 45 of the sleeve 44 (see also Fig. 5) depends below the lower end of the nozzle sleeve section 27 and supports a horizontally disposed rigid valve seat 46 which extends under and normally closes the lower open end of the nozzle sleeve section 27. The valve seat 46 is formed with a convex seating face 47 the ridge, peak or axis of which preferably is normal to the bridge portion 45 of the sleeve.

For cooperation with the convex seating face 47, the lower open end of the resilient nozzle sleeve section 27 is shaped with concave edges or faces to fit closely against the convex face 47 as shown in Fig. 5. This shaped resilient nozzle section 27 yieldably presses against the rigid convex face 47 so as to provide when closed, a nondrip, leakproof delivery valve.

The delivery valve is maintained in its closed position by a horizontally disposed actuating arm 51 which intermediate its length is mounted on a pivot pin 52 carried in the lifter block 32. The actuating arm 51 extends outwardly beyond the valve sleeve 44 and adjacent the valve sleeve carries a pin 53 which engages in a notch 54 (see also Fig. 4) in the outer face of the sleeve to loosely connect the sleeve to the actuating arm. Beyond this pin 53 the actuating arm 51 is provided with a free terminal end 55 which is engageable with cam projections for lifting and lowering the arm as will be hereinafter explained. The opposite end of the actuating arm 51 carries a leaf spring 56 formed to engage under or over a locking lug 57 on the lifter block 32 to retain the delivery valve in closed or open position as will be explained.

In operation, the stationary cam 42 raises the lifter rod 33 at the proper time as the filling head travels along its path of travel as mentioned hereinbefore, and this raises the lifter block 32 and the parts attached thereto. This lifting action raises the lifter collar 31 and thus pushes the small end of the resilient nozzle 24 and the conical member 21 attached thereto, upwardly toward the milk supply tank 15 thus compressing the nozzle as shown in Fig. 2. Since the upper, large or wide end of the resilient nozzle 24 is secured to the bottom of the tank 15, the nozzle intermediate its small and large ends when compressed, buckles or collapses as shown in Fig. 2 to compensate for the upward travel of the lower small end. This permits the conical member 21 to be pushed up into the measuring chamber 11 to a position above the inlet ports 13 and thereby closes the ports 13 and segregates the measured charge of milk in the measuring chamber from the milk in the tank.

It should be understood that when the inlet ports 13 are open the milk from the tank 15 fills the chamber 11, the interior spaces in the conical member 21 and nozzle sleeve 27 to the delivery valve seat 46 and rises up into the volume control vent 19 to the level of the milk in the tank 15. When the conical member 21 rises to shut off the inlet ports 13 the milk segregated in the measuring chamber 11 is slightly compressed and this forces excess milk up through the vent channel 19 where it spills back into the tank. This is a conventional method of segregating a measured charge of the milk. The milk left in the chamber 11, the vent channel 19 and the nozzle parts is the predetermined measured charge to be delivered into a container.

The delivery valve at the bottom end of the resilient nozzle sleeve section 27 rises with the nozzle parts during this lifting action and thus remains closed to hold the measured charge of milk in the chamber and nozzle. The valve is opened only if a container A is in place under the filling head with the delivery valve including its seat 46 and the lower end of the resilient nozzle sleeve section 27 inserted into the filling and dispensing opening B of the container, in readiness to deliver the measured charge of milk into the container.

The opening of the delivery valve is effected by a downward movement of the free terminal end 55 of the actuating arm 51. This may be brought about in any suitable manner such as by a stationary lug or a movable lug against which the arm 51 engages as it passes by. The drawings show a movable downwardly tapered lug 62 (Figs. 2 and 3) which is connected with a no-can-no-fill device. The lug 62 is formed on the upper end of a spring held upright lever 63 mounted on a pivot pin 64 secured in a bracket of the machine frame 10. The lower end of the lever is formed with an arm 67 which normally is held in the path of travel of the containers A.

If no container A is in position under the filling head as the head passes the arm 67, the arm is not engaged and the valve remains closed to prevent the discharge of the milk. If a container is in position to receive the milk, the container as it passes by, engages the arm 67 and pushes it outwardly. This rocks the lever 63 and thereby positions the upper lug 62 into the path of the valve actuating arm 51 as shown in Fig. 2. The arm 51, as it passes by, rides against the downwardly tapered lug 62 and is thus depressed to the position shown in Fig. 3. This depression of the arm 51 lowers the valve sleeve 44 and thereby lowers the convex valve seat 46 away from the lower concave end of the nozzle discharge sleeve section 27. This opens the nozzle and permits the milk to flow out.

By reference to Figs. 5 and 6 it will be noticed that due to the ridged convex shape of the valve seating face 47, the milk is delivered into the container in substantially two main oppositely directed and concentrated streams which extend outwardly and downwardly against two sides of the container in such volume as to prevent foaming of the milk. In thus directing the milk in concentrated streams, open spaces are left in front of and behind the valve and these spaces provide for natural venting of the air from the interior of the container and thus further reduce the tendency of the milk to foam.

When the arm 51 is depressed to open the valve, the leaf spring 56 on the opposite end of the arm snaps up over the locking lug 57 (Fig. 3) and thus holds the valve open until the measured charge of milk completely drains out of the nozzle into the container. This filling operation usually takes place while the filling head is advancing along its path of travel and at a predetermined station along this path, the arm 51 engages against a stationary lug 71 which raises the arm and thereby closes the valve. The filled container is then removed from the nozzle, its friction plug C closed to seal the opening B and thereafter discharged from the machine. The cam 42 then lowers the lifter rod 33 and its lifter block 32 to return the resilient nozzle 24 and the conical cutoff member 21 to their original positions. This uncovers the inlet ports 13 and thereby permits milk from the tank 15 to flow into the measuring chamber 11 for a repeat filling operation on another container.

In such a filling head the various parts including the resilient nozzle 24, the conical cutoff member 21, and the valve sleeve 44 may be readily disassembled to facilitate thorough cleaning of the head and to thereby maintain sanitary conditions in the machine. To remove the resilient nozzle 24 it is merely necessary to push its small end upwardly into the measuring chamber 11. This expands the large end of the nozzle and turns its outer marginal edge portion outwardly away from the terminal bead 17 on the tank flange 16. The nozzle may then be easily lowered away from the tank.

In a similar manner, the nozzle 24 may be released from the lifter block 32 and the cut off member 21 by loosening of the clamp ring 35 and sliding it upwardly around the nozzle. The small end of the nozzle may then be withdrawn from the lifter ring 31 and the valve sleeve 44 and the cutoff member 21 pulled out of the nozzle.

Reassembling the nozzle 24 is effected by pushing the cutoff member into the nozzle and snapping its projecting bead 25 into place in the small end of the nozzle. In a like manner the bead 26 on the large end of the nozzle is readily snapped over the terminal bead 17 on the flange 16 of the tank 15 to hold the nozzle in place.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for filling liquids into containers, the combination of a liquid supply tank, a housing in said tank setting off a measuring chamber for measuring out a charge of the liquid to be filled into a container, said housing having an inlet port therein for admitting liquid from said tank into said chamber, a cutoff member slideably disposed in said housing and movable into a position over said inlet port for segregating from said tank a measured charge of liquid in said chamber, a nozzle on said cutoff member for directing said liquid into said container, said nozzle terminating in a concave shaped valve face at its discharge end, a valve seat mounted for movement relative to said nozzle and having a ridged convex face normally seating against said concave valve face for stopping the flow of liquid from said nozzle, means for shifting said cutoff member into inlet port closing position to segregate said charge of liquid, and means for moving said valve seat to separate said concave and convex faces and discharge said segregated charge of liquid against said ridged convex face of the valve seat whereby the flowing liquid is delivered into the container in substantially two main oppositely directed streams.

2. In a machine for filling liquids into containers, the combination of a liquid supply tank, a housing in said tank setting off a measuring chamber for measuring out a charge of the liquid to be filled into a container, said housing having inlet ports therein for admitting liquid from said tank into said chamber, an inverted conical shaped cutoff member having its wide end slideably disposed in said housing and movable into a position over said inlet ports for segregating from said tank a measured charge of liquid in said chamber, said cutoff member having its narrow end extended below said housing and having an unrestricted opening through said member, an inverted conical shaped resilient nozzle surrounding said cutoff member in immediate contact therewith and having its narrow end connected to the narrow end of said cutoff member, the wide end of said nozzle being secured to said tank around said housing for delivering the liquid to a container, the narrow end of said nozzle having a depending sleeve section having an unrestricted opening therethrough for discharging said liquid, a normally closed valve element mounted on said nozzle adjacent its discharge end and movable relative to said nozzle, means for compressing said nozzle to shift said cutoff member into inlet port closing position to segregate said charge of liquid, and means for opening said valve element to discharge said segregated charge of liquid into a container.

3. In a machine of the character defined in claim 2 wherein the narrow end of the conical cutoff member is formed with a projecting bead for a snap-over connection with said conical nozzle and wherein said tank is provided with a depending flange terminating in a projecting bead for a snap-over connection with the wide end of said conical nozzle to provide for easy removal of said nozzle and said cutoff member to facilitate cleaning of said nozzle and members.

4. In a machine for filling liquids into containers, the combination of a liquid supply tank, a housing in said tank setting off a measuring chamber for measuring out a charge of the liquid to be filled into a container, said housing having inlet ports therein for admitting liquid from said tank into said chamber, a cutoff member slideably disposed in said housing and movable into a position over said inlet ports for segregating from said tank a measured charge of liquid in said chamber, a resilient nozzle connected with said cutoff member for delivering liquid to a container, said resilient nozzle having a resilient depending tubular sleeve section terminating in a concave shaped valve face, a rigid valve sleeve surrounding and slideably mounted on the sleeve section of said nozzle, said valve sleeve having a depending bridge member supporting a valve seat extending under the discharge end of said nozzle sleeve section and having a convex seating face for cooperation with the resilient concave valve face of said nozzle sleeve section to provide a leakproof union therebetween when said faces are closed against each other to hold said liquid in said measuring chamber, said convex seating face when said faces are separated to deliver the charge of liquid into a container, delivering said liquid downwardly and outwardly in oppositely disposed concentrated streams to deliver said liquid quickly and quietly without foaming, means for compressing said nozzle to shift said cutoff member into inlet port closing position to segregate said charge of liquid, and means for separating said valve and seat faces to discharge said segregated charge of liquid into a container.

5. In a machine for filling liquids into containers, the combination of a liquid supply tank, a housing in said tank setting off a measuring chamber for measuring out a charge of the liquid to be filled into a container, said housing having inlet ports therein for admitting liquid from said tank into said chamber, a cutoff member slideably disposed in said housing and movable into a position over said inlet ports for segregating from said tank a measured charge of liquid in said chamber, a resilient nozzle connected with said cutoff member for delivering liquid to a container, a normally closed valve element mounted on said nozzle adjacent its discharge end and movable relative to said nozzle, a lifter block secured to said nozzle, means for raising said lifter block to compress said nozzle to shift said cutoff member into inlet port closing position to segregate said charge of liquid, a valve actuating member connected with said valve element and said lifter block and movable with said block for actuating said valve element, and independent means engageable with said valve actuating member for opening said valve element.

References Cited in the file of this patent

UNITED STATES PATENTS 889,106    Cunningham          May 26, 1908